US009804593B1

(12) United States Patent
Davis et al.

(10) Patent No.: US 9,804,593 B1
(45) Date of Patent: Oct. 31, 2017

(54) METHODS AND SYSTEMS FOR TEACHING POSITIONS TO COMPONENTS OF DEVICES

(71) Applicant: X Development LLC, Mountain View, CA (US)

(72) Inventors: Benjamin Davis, Mountain View, CA (US); Anthony Sean Jules, Oakland, CA (US)

(73) Assignee: X Development LLC, Mountain View, CA (US)

( * ) Notice: Subject to any disclaimer, the term of this patent is extended or adjusted under 35 U.S.C. 154(b) by 91 days.

(21) Appl. No.: 14/569,121

(22) Filed: Dec. 12, 2014

(51) Int. Cl.
*B25J 9/22* (2006.01)
*G05B 19/42* (2006.01)

(52) U.S. Cl.
CPC .................. *G05B 19/42* (2013.01)

(58) Field of Classification Search
CPC .... G05B 19/425; G05B 19/423; G05B 19/42; G05B 2219/35543; G05B 2219/39002; G05B 2219/45083; G05B 19/253; G05B 2219/34236; G05B 2219/34239; G05B 2219/35238; G05B 2219/36422; G05B 2219/39468
USPC .......... 318/568.12, 568.13, 568.14; 700/245, 700/258, 261
See application file for complete search history.

(56) References Cited

U.S. PATENT DOCUMENTS

| | | | | |
|---|---|---|---|---|
| 3,920,972 A | * | 11/1975 | Corwin, Jr. .......... | G05B 19/425 700/251 |
| 3,943,343 A | * | 3/1976 | Irie .................... | G05B 19/4103 219/124.34 |
| 4,163,183 A | * | 7/1979 | Engelberger .......... | B23P 21/002 318/568.13 |
| 4,260,940 A | * | 4/1981 | Engelberger .......... | B23P 21/002 318/562 |
| 4,260,941 A | * | 4/1981 | Engelberger .......... | B23P 21/002 318/568.13 |
| 4,338,672 A | * | 7/1982 | Perzley .................... | B25J 9/161 318/568.13 |
| 4,348,623 A | * | 9/1982 | Kobayashi ....... | G05B 19/41825 318/568.13 |
| 4,385,358 A | * | 5/1983 | Ito ........................ | G05B 19/425 318/573 |
| 4,396,987 A | * | 8/1983 | Inaba ............... | G05B 19/41825 700/159 |
| 4,408,286 A | * | 10/1983 | Kikuchi .................... | B25J 9/046 318/568.14 |

(Continued)

FOREIGN PATENT DOCUMENTS

WO    WO2012/143044    10/2012

*Primary Examiner* — Paul Ip
(74) *Attorney, Agent, or Firm* — McDonnell Boehnen Hulbert & Berghoff LLP

(57) ABSTRACT

Methods and systems for teaching positions to components of devices are described. An example method includes providing instructions to a robotic device or robotic manipulator to place the robotic manipulator into a fine-tuning teach mode, in which the robotic manipulator is in a given position and is configured to move based on application of a manual contact in one or more step movements having a preset amount of distance. The method also includes determining that a given manual contact is applied to the robotic manipulator, and causing the robotic manipulator to incrementally move in the one or more step movements having the preset amount of distance.

20 Claims, 7 Drawing Sheets

(56) References Cited

U.S. PATENT DOCUMENTS

| | | | | |
|---|---|---|---|---|
| 4,467,436 A * | 8/1984 | Chance | G05B 19/4141 | 700/249 |
| 4,698,777 A * | 10/1987 | Toyoda | G05B 19/41 | 318/568.18 |
| 4,737,697 A * | 4/1988 | Maruo | B25J 9/042 | 318/568.13 |
| 4,764,883 A * | 8/1988 | Nakagawa | G05B 19/423 | 700/251 |
| 4,823,279 A * | 4/1989 | Perzley | B25J 17/0283 | 700/251 |
| 4,903,213 A * | 2/1990 | Buhler | G05B 19/4103 | 318/573 |
| 5,025,393 A * | 6/1991 | Naito | G05B 19/425 | 700/264 |
| 5,051,675 A * | 9/1991 | Okumura | G05B 19/423 | 318/568.1 |
| 5,053,976 A * | 10/1991 | Nose | G05B 19/427 | 700/251 |
| 5,079,491 A * | 1/1992 | Nose | G05B 19/4148 | 318/567 |
| 5,103,149 A * | 4/1992 | Kimura | G05B 19/423 | 318/568.1 |
| 5,155,423 A * | 10/1992 | Karlen | B25J 9/04 | 318/568.1 |
| 5,204,599 A * | 4/1993 | Hohn | G05B 19/4103 | 318/571 |
| 5,303,333 A * | 4/1994 | Hoos | G05B 19/39 | 700/245 |
| 5,444,343 A * | 8/1995 | Enomoto | G05B 19/4141 | 318/567 |
| 5,519,602 A * | 5/1996 | Yellowley | G05B 15/02 | 700/3 |
| 5,949,683 A * | 9/1999 | Akami | G05B 19/425 | 700/123 |
| 5,980,082 A * | 11/1999 | Watanabe | B25J 9/1658 | 700/86 |
| 6,124,693 A * | 9/2000 | Okanda | G05B 19/4086 | 318/564 |
| 6,212,443 B1 * | 4/2001 | Nagata | G05B 19/423 | 318/568.13 |
| 6,216,056 B1 * | 4/2001 | Ito | B25J 9/16 | 700/157 |
| 6,218,802 B1 * | 4/2001 | Onoue | G05B 19/425 | 318/567 |
| 6,294,910 B1 * | 9/2001 | Travostino | G01D 5/24404 | 318/601 |
| 6,347,259 B1 * | 2/2002 | Goldenberg | G05B 19/404 | 700/213 |
| 6,382,012 B2 * | 5/2002 | Hara | G01L 25/00 | 73/1.15 |
| 6,408,224 B1 * | 6/2002 | Okamoto | B25J 9/1661 | 29/721 |
| 6,408,225 B1 * | 6/2002 | Ortmeier | B25J 19/0012 | 192/58.62 |
| 6,623,431 B1 * | 9/2003 | Sakuma | A61B 5/02007 | 600/417 |
| 6,774,598 B1 * | 8/2004 | Kohler | G05B 19/41 | 318/561 |
| 6,944,584 B1 * | 9/2005 | Tenney | B25J 9/1671 | 700/17 |
| 7,047,107 B2 * | 5/2006 | Kimura | B25J 9/1664 | 318/560 |
| 7,129,664 B2 * | 10/2006 | Kubo | B25J 9/1664 | 318/567 |
| 7,376,488 B2 | 5/2008 | Watanabe et al. | | |
| 7,391,178 B2 * | 6/2008 | Tanaka | B25J 9/1676 | 318/568.2 |
| 7,729,805 B2 * | 6/2010 | Katsumata | B25J 9/1671 | 318/568.18 |
| 7,778,731 B2 * | 8/2010 | Ogawa | B25J 9/1641 | 318/568.12 |
| 8,175,750 B2 * | 5/2012 | Tsusaka | B25J 9/1664 | 700/250 |
| 8,185,846 B2 * | 5/2012 | Kuwahara | G05B 19/409 | 715/866 |
| 8,321,054 B2 | 11/2012 | Selnes et al. | | |
| 8,504,206 B2 * | 8/2013 | Fudaba | B25J 3/04 | 700/253 |
| 8,548,822 B2 * | 10/2013 | Moctezuma de la Barrera | G06Q 10/06316 | 705/2 |
| 8,843,236 B2 | 9/2014 | Barajas et al. | | |
| 2002/0011092 A1 * | 1/2002 | Hara | G01L 25/00 | 73/1.13 |
| 2004/0054437 A1 * | 3/2004 | Kimura | B25J 9/1664 | 700/245 |
| 2005/0222714 A1 * | 10/2005 | Nihei | G05B 19/423 | 700/264 |
| 2005/0256606 A1 * | 11/2005 | Irri | B21D 5/02 | 700/213 |
| 2006/0025889 A1 * | 2/2006 | Katsumata | B25J 9/1671 | 700/245 |
| 2006/0069466 A1 * | 3/2006 | Kato | B25J 9/1682 | 700/264 |
| 2006/0108960 A1 * | 5/2006 | Tanaka | B25J 9/1676 | 318/568.21 |
| 2006/0178775 A1 * | 8/2006 | Zhang | B25J 9/1674 | 700/245 |
| 2006/0197486 A1 * | 9/2006 | Kubo | B25J 9/1664 | 318/568.12 |
| 2007/0150107 A1 * | 6/2007 | Ogawa | B25J 9/1641 | 700/245 |
| 2008/0027580 A1 * | 1/2008 | Zhang | B25J 9/1633 | 700/245 |
| 2009/0105880 A1 * | 4/2009 | Okazaki | B25J 9/1633 | 700/258 |
| 2009/0125146 A1 * | 5/2009 | Zhang | B25J 9/1664 | 700/253 |
| 2009/0241047 A1 * | 9/2009 | Kuwahara | G05B 19/409 | 715/765 |
| 2009/0312867 A1 * | 12/2009 | Hasegawa | B62D 57/032 | 700/245 |
| 2010/0017033 A1 * | 1/2010 | Boca | B25J 9/0093 | 700/258 |
| 2010/0087955 A1 * | 4/2010 | Tsusaka | B25J 9/0003 | 700/245 |
| 2010/0092032 A1 * | 4/2010 | Boca | B25J 9/1679 | 382/103 |
| 2010/0145520 A1 * | 6/2010 | Gerio | B25J 13/06 | 700/264 |
| 2010/0152896 A1 * | 6/2010 | Komatsu | B25J 9/0003 | 700/258 |
| 2010/0191374 A1 * | 7/2010 | Tsai | G05B 19/404 | 700/258 |
| 2010/0268386 A1 * | 10/2010 | Kiyota | B25J 9/1674 | 700/264 |
| 2010/0286826 A1 * | 11/2010 | Tsusaka | B25J 9/1633 | 700/254 |
| 2010/0332032 A1 * | 12/2010 | Moriyama | B25J 9/1682 | 700/258 |
| 2011/0015785 A1 * | 1/2011 | Tsusaka | B25J 9/0003 | 700/254 |
| 2011/0125322 A1 * | 5/2011 | Rademacher | G05B 19/42 | 700/245 |
| 2011/0270443 A1 * | 11/2011 | Kamiya | G05B 19/401 | 700/245 |
| 2011/0270444 A1 * | 11/2011 | Nagata | G05B 19/401 | 700/258 |
| 2012/0010747 A1 * | 1/2012 | Okazaki | G05B 19/423 | 700/253 |
| 2012/0130541 A1 * | 5/2012 | Szalek | B25J 9/106 | 700/258 |
| 2012/0173021 A1 * | 7/2012 | Tsusaka | B25J 9/1664 | 700/258 |
| 2012/0191245 A1 * | 7/2012 | Fudaba | B25J 9/1633 | 700/254 |

(56) References Cited

U.S. PATENT DOCUMENTS

| | | | | |
|---|---|---|---|---|
| 2012/0197438 A1* | 8/2012 | Ogami | ............... | B25J 9/1682 700/258 |
| 2013/0204435 A1* | 8/2013 | Moon | ............... | G09B 19/00 700/258 |
| 2013/0238132 A1* | 9/2013 | Kurth | ............... | B25J 9/1612 700/260 |
| 2013/0297072 A1* | 11/2013 | Fudaba | ............... | B25J 3/04 700/260 |
| 2013/0345866 A1* | 12/2013 | Tanaka | ............... | G05B 19/425 700/250 |
| 2014/0188281 A1* | 7/2014 | Nagai | ............... | B25J 9/0081 700/264 |
| 2014/0336820 A1* | 11/2014 | Fudaba | ............... | G06F 3/041 700/261 |
| 2014/0343729 A1* | 11/2014 | Fudaba | ............... | B25J 13/00 700/261 |
| 2015/0209961 A1* | 7/2015 | Komatsu | ............... | B25J 9/1676 700/255 |

\* cited by examiner

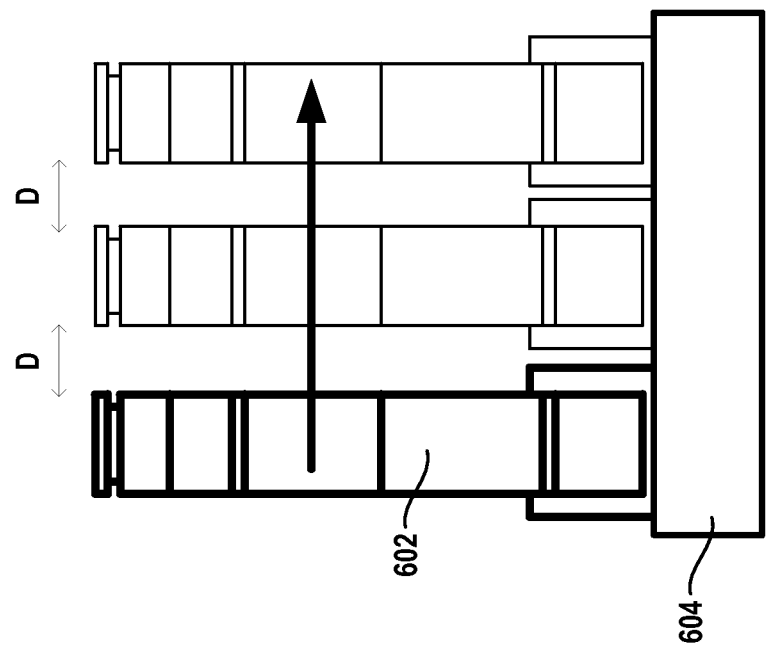
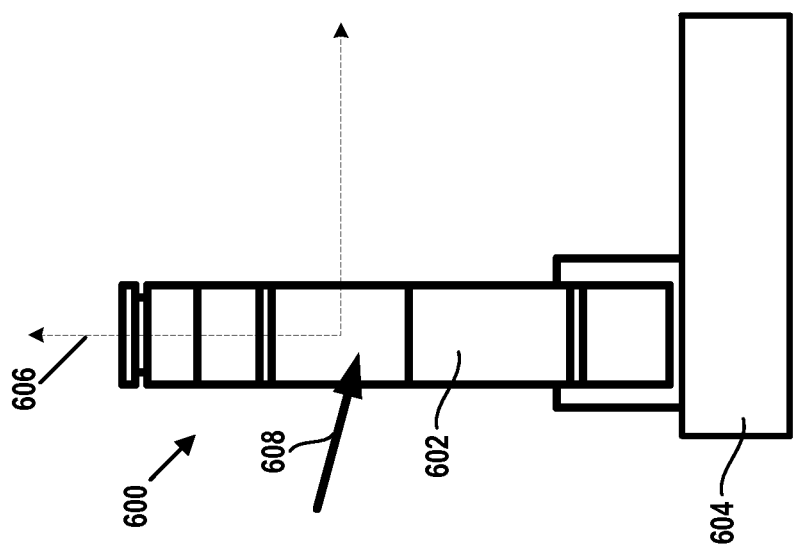

METHODS AND SYSTEMS FOR TEACHING POSITIONS TO COMPONENTS OF DEVICES

BACKGROUND

Unless otherwise indicated herein, the materials described in this section are not prior art to the claims in this application and are not admitted to be prior art by inclusion in this section.

Robotic devices can be programmed to perform many tasks in a detailed manner, or can be programmed in a general manner and then a specific implementation of a task can be determined based on environment or objects available to the robotic device. The robotic device may utilize an audio feedback technique to inform humans nearby of an action or an intent of the robotic device, such as to inform of future actions that the robotic device intends to perform. However, auditory comments may be undesirable in some instances.

SUMMARY

In one example, a method is described comprising providing, by one or more processors, instructions to a robotic device to place the robotic device into a fine-tuning teach mode. In the fine-tuning teach mode, a component of the robotic device is in a given position and is configured to move in one or more step movements based on application of a manual contact having a preset amount of distance. The method also includes determining that a given manual contact is applied to the robotic device or to the component of the robotic device, and in response to determining that the given manual contact is applied to the component of the robotic device causing, by the one or more processors, the robotic manipulator to incrementally move in the one or more step movements having the preset amount of distance.

In another example, another method is described comprising receiving, at a computing device, instructions to place a component of the computing device into a fine-tuning teach mode. In the fine-tuning teach mode, the component is in a given position and is configured to move in one or more step movements based on application of a manual contact having a preset amount of distance. The method also includes the component of the computing device receiving an applied manual contact, and the component of the computing device responsively moving in the one or more step movements having the preset amount of distance.

In still another example, a system is described comprising one or more components coupled to a computing device, and data storage including instructions executable by one or more processors to cause the one or more components or the computing device to perform functions. The functions comprise receiving instructions to place the one or more components coupled to the computing device into a fine-tuning teach mode. In the fine-tuning teach mode, the one or more components are in a given position and are configured to move in one or more step movements based on application of a manual contact having a preset amount of distance. The functions also comprise determining that a given manual contact is applied to the one or more components, and causing the one or more components to move in the one or more step movements having the preset amount of distance.

In yet another example, a system is described comprising a means for determining that a manual contact is applied to one or more components of a computing device, and a means for associating the manual contact to a step movement of the component. The step movement indicates an amount of movement. The system also comprises a means for determining a number of step movements to apply, and a means for causing the one or more components to move the number of step movements and then stop.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIGS. 6A and 6B illustrate additional example operation of methods described herein.

DETAILED DESCRIPTION

Figure 1:
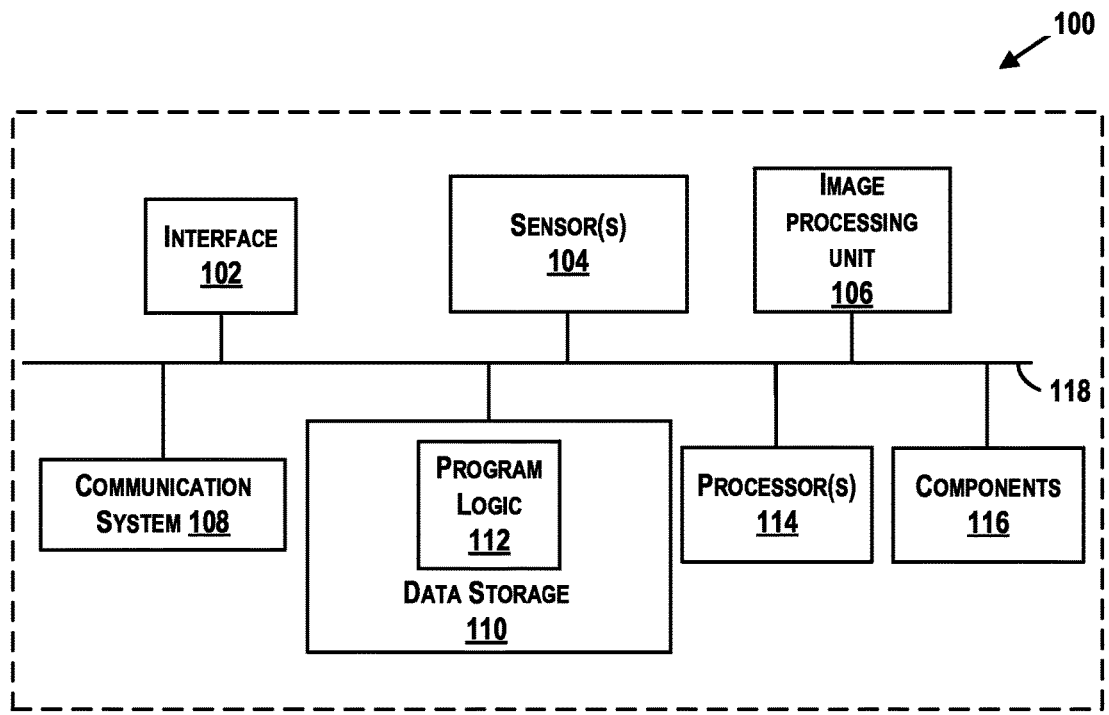
FIG. 1 is a block diagram of a computing device, according to an example embodiment.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Within examples, robotic devices may include one or more robotic manipulators, such as in a form of an arm, which may be configured to move in certain manners. Movement may be provided to the robotic device while the robotic device is in a teach mode, in which a teachable arm of the robot is manually taught movements along a three dimensional path by a human operator. The movements of the teachable arm are converted to electrical signals which are memorized and stored. These stored signals can be subsequently converted to command signals applied from the memory to a powered operating arm of the robot that will repeat the instruction content of the signals to accurately duplicate all that was taught to the teachable arm so as to replay the movements, for example.

Thus, to teach an arm, the arm is moved to a certain position, and movement to the position as well as the position can be saved. Often times, some applications may require a higher precision of movements than a human can perform with the arm. In such instances, a human can provide approximate movements, and further computer processing can be performed on the stored movements to provide higher resolution movements (e.g., such as for movements of less than a millimeter). A human may thus provide coarse positioning through manual or physical movement, and fine-tuning can be achieved through subsequent computer processing.

In other examples herein, methods are described for determining that a manual contact is applied to a robotic manipulator, associating the manual contact to a step movement of the robotic manipulator that indicates an amount of movement, determining a number of step movements to apply, and causing the robotic manipulator to move the number of step movements in increments and then stop. In some examples, force sensing can be utilized on a robotic manipulator to "micro-jog" a position so as to allow fine-tuning of teach positions at orders of magnitude of higher resolution than typically enabled through manual adjustment.

Examples may be implemented when a robotic device is placed into a mode for teaching, such that components of the robotic device are not force compliant and are movable by application of external forces by a user. Based on application of a force, such as pressing an arm of a robot, the arm may then move a set step (e.g., 50 microns) and then stops. Thus, a user may roughly position the arm, and fine-tuning may be accomplished through step movements. Application of the force may be detected by force sensors in the arms, resistive capacitors, pressure sensors, or through detection of movement of the arm such as by accelerometers of the arm, for example.

An amount of movement and a direction of movement of the component of the robotic device can be controlled. For example, based on application of a manual contact to the component, many joints may be movable, and thus, the component may be configured to move in a direction orthogonal to a direction of the application of contact. Further, the manual contact can be mapped to certain distances of movement. Mapping can be based on an amount of force, a duration of force, etc. that maps to an amount of a "step" taken or a distance of steps taken.

In addition, the component or the robotic device may be configured to provide feedback indicating that a step has been taken by the component, such as in the form of visual (e.g., blinking light), audio, or a vibration.

Examples described here apply to forms of robotic devices, and more generally, to forms of computing devices that include components movable or configurable into a number of positions (e.g., an external camera or microphone connected to a mobile phone).

Referring to the Figures, FIG. 1 is a block diagram of a computing device 100, according to an example embodiment. In some examples, some components illustrated in FIG. 1 may be distributed across multiple computing devices (e.g., desktop computers, servers, hand-held devices, etc.). However, for the sake of the example, the components are shown and described as part of one example device. The computing device 100 may include an interface 102, sensor(s) 104, an image processing unit 106, a communication system 108, data storage 110 with program logic 112, a processor 114, and configurable components 116. Components illustrated in FIG. 1 may be linked together by a communication link 118. In some examples, the device 100 may include hardware to enable communication within the computing 100 and another computing device (not shown).

The interface 102 may be configured to allow the computing device 100 to communicate with another computing device (not shown). Thus, the interface 102 may be configured to receive input data from one or more devices. In some examples, the interface 102 may also maintain and manage records of data received and sent by the computing device 100. In other examples, records of data may be maintained and managed by other components of the computing device 100. The interface 102 may also include a receiver and transmitter to receive and send data. In some examples, the interface 102 may also include a user-interface, such as a keyboard, microphone, touch screen, etc., to receive inputs as well. Further, in some examples, the interface 102 may also include interface with output devices such as a display, speaker, etc.

The sensor(s) 104 may be any number of sensors, such as force sensors to detect an applied force to one or more of the components 116 and output a force measurement, an accelerometer or gyroscope to detect motion or movement of one or more of the components 116 and output a measurement, or other sensor capable of detecting movement of the components 116.

The image processing unit 106 may be a camera or other optical device capable of detecting motion or movement of the components 116, for example.

The communication system 108 may include a wired communication interface (e.g., parallel port, USB, etc.) and/or a wireless communication interface (e.g., antenna, transceivers, etc.) to receive and/or provide signals from/to external devices. In some examples, the communication system 108 may receive instructions for operation of the computing device 100. Additionally or alternatively, in some examples, the communication system 108 may provide output data. In one example, the communication system 108 may be configured to provide for display a graphical image of movement of the device 100 overlaid onto a representation of the geometric layout of an environment of the device 100.

The data storage 110 may store program logic 112 that can be accessed and executed by the processor(s) 114. The program logic 112 may contain instructions provide control to the one or more components 116 of the computing device 100. For example, program logic 112 may provide instructions that adjust operation of the device 100 based on stored amounts of movement mapped to a received contact. The data storage 110 may comprise one or more volatile and/or one or more non-volatile storage components, such as optical, magnetic, and/or organic storage, and the data storage may be integrated in whole or in part with the processor(s) 114.

The processor(s) 114 may comprise one or more general-purpose processors and/or one or more special-purpose processors. To the extent the processor 114 includes more than one processor, such processors may work separately or in combination. For example, a first processor may be configured to operate the sensor(s) 104, and a second processor may operate the image processing unit 106.

Still further, while each of the components are shown to be integrated in the computing device 100, in some embodiments, one or more components may be removably mounted to otherwise connected (e.g., mechanically or electrically) to the computing device 100 using wired or wireless connections. The computing device 100 may take other forms as well.

The components 116 may be any type of module or physical component that can be configured into a number of configurations or adjusted into a number of movements. There are many examples of types of components. In one instance, the computing device 100 may take the form of a robotic device, and thus, components of the robotic device may include robotic manipulators (such as an arm) that can move in a number of degrees of freedom. In another example, the computing device 100 may take the form of a mobile telephone, and component of the mobile phone may include an external camera or flash that connects to the phone and may be adjusted into a number of positions.

Figure 2:
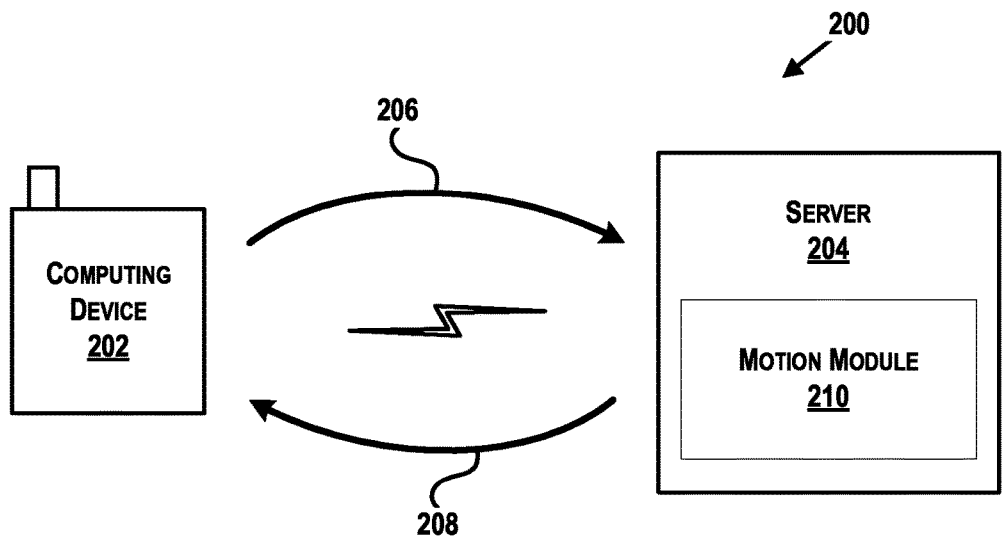
FIG. 2 illustrates an example communication system in which an example method may be implemented.

FIG. 2 illustrates an example communication system 200 in which an example method may be implemented. In FIG. 2, a computing device 202 may communicate with a server 204 via one or more wired and/or wireless interfaces. The computing device 202 and the server 204 may communicate within a network. Alternatively, the computing device 202 and the server 204 may each reside within a respective network.

The computing device 202 may be any type of computing device or transmitter including a laptop computer, a mobile telephone, tablet computing device, a robotic device, etc., that is configured to transmit data 206 to or receive data 208 from the server 204 in accordance with the method and functions described herein. The computing device 202 may include a user interface, a communication interface, a processor, and data storage comprising instructions executable by the processor for carrying out one or more functions relating to the data sent to, or received by, the server 204.

The server 204 may be any entity or computing device arranged to carry out the methods and computing device functions described herein. Further, the server 204 may be configured to send data 208 to or receive data 206 from the computing device 202. The server 204 may include a motion module 210 which may be configured to process the data 206 received from the computing device 202 to determine a motion or movement of a component of the computing device 202 to be applied based on a detected manual contact to the component, for example.

Figure 3:
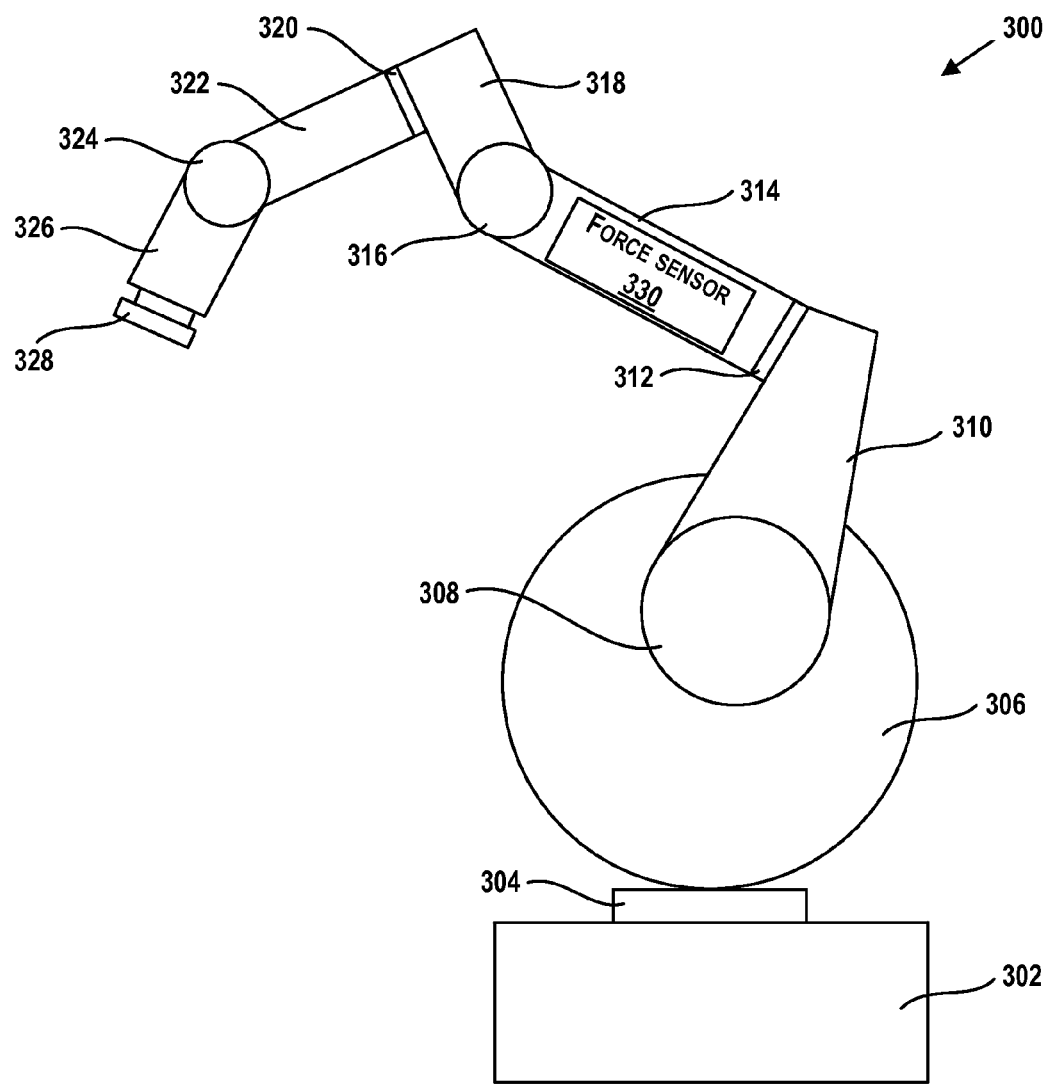
FIG. 3 illustrates an example of a computing device in a form of a robotic device.

FIG. 3 illustrates an example of a computing device in a form of a robotic device 300. The robotic device 300 may contain hardware, such as a processor, memory or storage, and sensors that enable the robotic device 300 to operate the robotic device for use in assembly operations, pick and place work, spot welding, etc. The robotic device 300 may be powered by various modules such as electric motor, pneumatic motors, hydraulic motors, etc. The robotic device 300 is shown to include a base 302, links 306, 310, 314, 318, 322, and 326, joints 304, 308, 312, 316, 320, and 324, and a manipulator 328.

The base 302 may provide a platform for support for the robotic device 300. The base 302 may be stationary or be coupled to a wheels in order to provide movement of the robotic device 300. The base may comprise any number of materials such as aluminum, steel, stainless steel, etc., that may be suitable for a given environment associated with the robotic device 300.

The links 306, 310, 314, 318, 322, and 326 may be configured to be moved according to a programmable set of instructions. For instance, the links may be configured to follow a predetermined set of movements in order to accomplish a repetitive task over a period of time. By way of example, the links 306, 310, 314, 318, 322, and 326 may form a kinematic chain that defines relative movement of a given link at a given joint of the joints 304, 308, 312, 316, 320, and 324. One or more of the links 306, 310, 314, 318, 322, and 326 together may form a portion of the robotic device 300 that may be referred to as a robotic manipulator.

The joints 304, 308, 312, 316, 320, and 324 may be configured to rotate through the use of a mechanical gear system. In one example, the mechanical gear system may be driven by a strain wave gearing, a cycloid drive, etc. The mechanical gear system selected may depend on a number of factors related to the operation of the robotic device 300 such as a length of the links 306, 310, 314, 318, 322, and 326, speed of rotation, desired gear reduction, etc. Providing power to the joints 304, 308, 312, 316, 320, and 324 will allow for the links 306, 310, 314, 318, 322, and 326 to be moved in a way that allows the manipulator 328 to interact with an environment.

The manipulator 328 may be configured to allow the robotic device 300 to interact the environment. In one example, the manipulator 328 may perform appropriate placement of an element through various operations such as lifting, maneuvering, and gripping etc. By way of example, the manipulator may be exchanged for another end effector that would provide the robotic device 300 with different functionality.

The robotic device 300 may be configured to operate according to a robot operating system (e.g., an operating system designed for specific functions of the robot). A robot operating system may provide libraries and tools (e.g., hardware abstraction, device drivers, visualizers, message-passing, package management, etc.) to enable robot applications.

In further examples, links of the robotic device 300 may include a force sensor, such as force sensor 300 on the link 314. Although one force sensor is shown, each link 306, 310, 314, 318, 322, and 326 may include individual force sensors, or outputs of the force sensor 330 may be based on contact or forces applied to any of the links 306, 310, 314, 318, 322, and 326.

Within examples, the robotic device 300 may be placed into a teach mode, in which components or any of the links 306, 310, 314, 318, 322, and 326 are moveable along one or more degrees of freedom, and based on movement, the robotic device 300 (e.g., a processor or memory of the device) can save positions of the links during the movement. In this way, an operating may manually move individual links of the robotic device 300 to train the robotic device 300 to perform a certain task, and motion of the device including position, velocity, and acceleration, can be recorded and saved, and later recalled to operate the robotic device 300 to perform the stored movements without the need for user action.

When teaching the robotic device 300, a user may manually move the device, or components of the device, into desired positions. It may be difficult to move the device small amounts, such as may be needed to precision movements and tasks. Within examples, the force sensor 330 of the robotic device may determine that a manual contact is applied to the link 314 (and other force sensors may be included for detecting and determining forces applied to other links), and the force sensor 330 may output detection of the force to a processor. The processor may be within the robotic device 300 or separate from the robotic device 300 within a server, for example, as shown in the alternate configurations in FIGS. 1-2, for example.

The processor may associate the manual contact to a step movement of the component that indicates an amount of movement, determine a number of step movements to apply, and then cause the component to move the number of step movements and then stop. Thus, a user does not have to provide precision movement instructions to the robotic device 300, but rather, applies contact to move a given link, and the contact triggers the link to move a preset amount of distance.

Figure 4A:
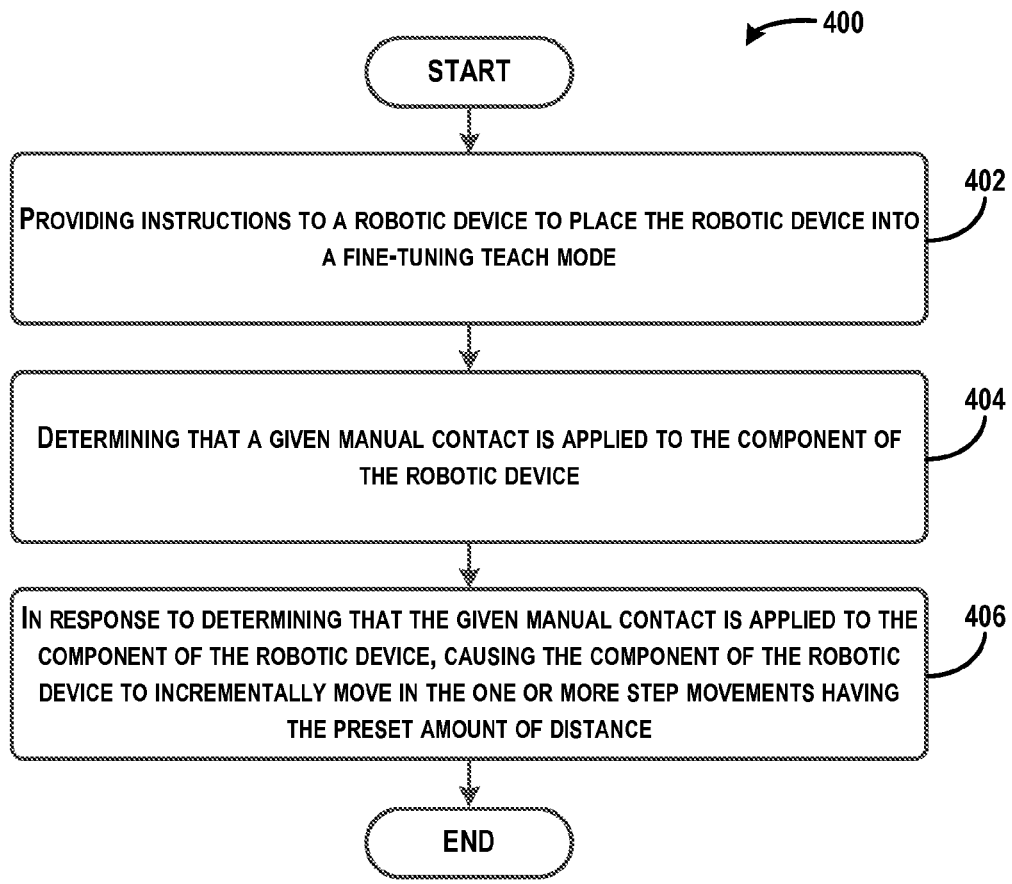
FIGS. 4A and 4B are block diagrams of example methods for teaching positions to components of devices, in accordance with at least some embodiments described herein.
Figure 4B:
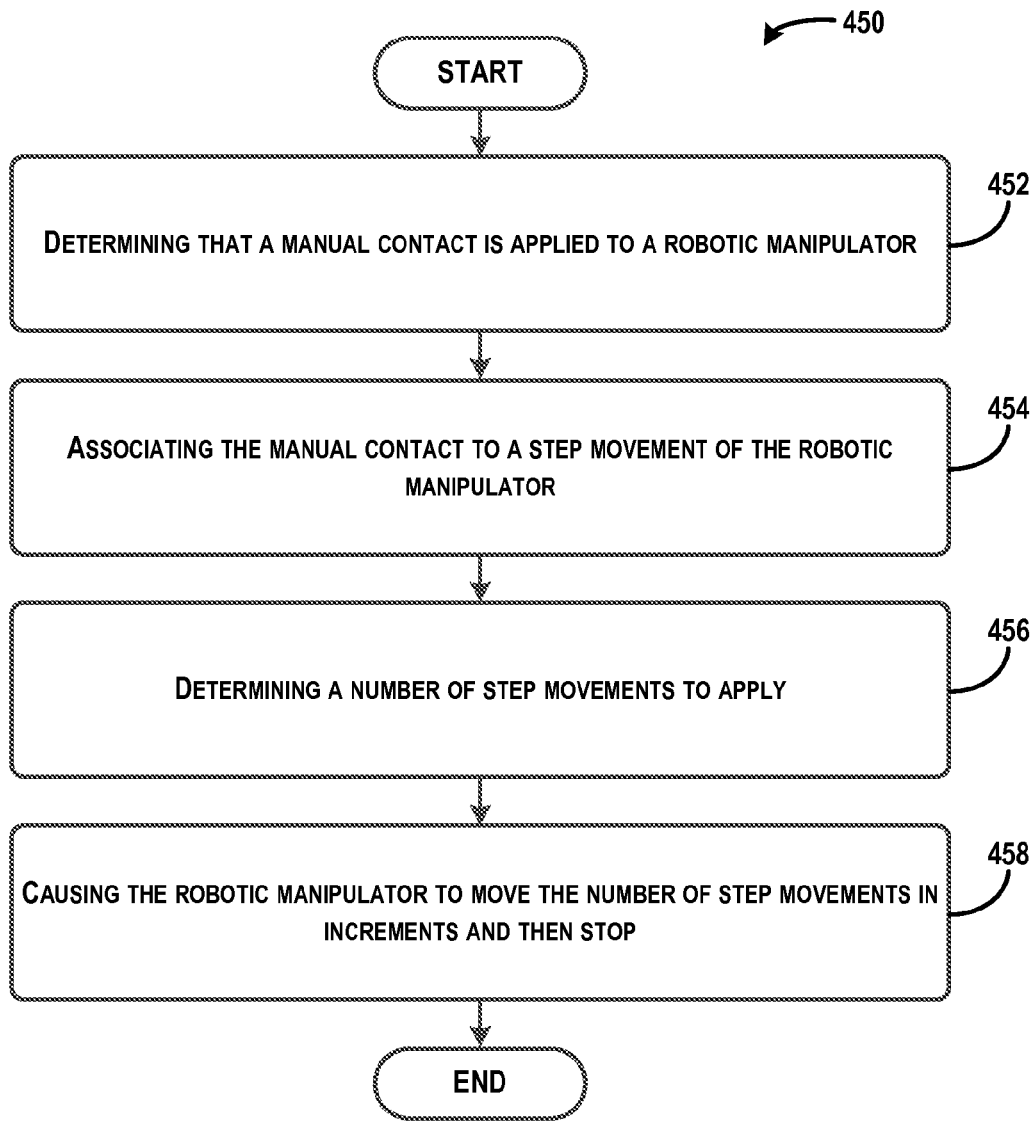

FIGS. 4A-4B are block diagrams of example methods for teaching positions to components of devices, in accordance with at least some embodiments described herein. In FIG.

4A, method 400 may include one or more operations, functions, or actions as illustrated by one or more of blocks 402-406. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method and other processes and methods disclosed herein, each block in FIGS. 4A-4B may represent circuitry that is wired to perform the specific logical functions in the process.

Illustrative methods, such as method 400, may be carried out in whole or in part by a component or components in the cloud and/or a robotic device or system, such as by the one or more of the components of the systems shown in FIGS. 1-2. However, it should be understood that example methods, such as method 400, may be carried out by other entities or combinations of entities (i.e., by other computing devices and/or combinations of computing devices). For example, functions of the method 400 may be fully performed by a computing device (or components of a computing device such as one or more processors), or may be distributed across multiple components of the computing device, across multiple computing devices, and/or across a server. In some examples, the computing device may receive information from sensors of the computing device, or where the computing device is a server the information can be received from another device that collects the information. As other examples, the method 400 may be performed by a computing device, by a server, or by a robotic device.

In FIG. 4A, at block 402, the method 400 includes providing, by one or more processors, instructions to a robotic device to place the robotic device into a fine-tuning teach mode. In the fine-tuning teach mode, a component of the robotic device (e.g., a robotic manipulator, arm, leg, etc.) is in a given position (e.g., an initial fixed position or in any position that is not fixed and is moving) and is configured to move based on application of a manual contact in one or more step movements having a preset amount of distance. In the fine-tuning teach mode, the distance the manipulator moves is a preset known distance, such that upon application of a contact (of any force, for example), the manipulator moves the set distance. Only one force need be applied, and does not have to be continuous. An amount of the preset distance for the step movement may be more or less than the amount of distance that the manipulator would move corresponding to the applied manual contact, for example. Thus, the applied contact is used as a trigger for the manipulator to move in the preset step movement amount(s).

In some examples, the fine-tuning teach mode may be contrasted with a coarse teach mode, in which, the robotic manipulator is moveable along one or more degrees of freedom, and based on movement, the robotic manipulator is configured to save one or more positions of the robotic manipulator during the movement. Coarse teach mode allows for free-form movement based on user-applied forces, and an amount of movement or distance of movement is determined on-the-fly due to how the user continuously moves the robotic manipulator.

At block 404, the method 400 includes determining that a given manual contact is applied to the component of the robotic, for example, through use of sensors configured to detect force or acceleration.

At block 406, the method 400 includes in response to determining that the given manual contact is applied to the component of the robotic device, causing, by the one or more processors, the robotic manipulator to incrementally move in the one or more step movements having the preset amount of distance. The step movements may all be associated with the same preset distance, or the manipulator can be programmed to move different amounts in subsequent steps based on preset distances per subsequent step. Movements may be incremental such that the robotic manipulator moves a step movement distance and then stops or pauses briefly, and then subsequently moves another step movement (depending on how many step movements to perform).

Within examples, the amount of distance is stored and determined based on application of the contact. The number of step movements can be determined based on an amount or duration of the contact, for example, as described below.

Turning now to FIG. 4B, as shown by block 452, the method 450 includes determining that a manual contact is applied to a robotic manipulator. In one example, a force sensor may detect an applied force or manual contact to a surface of the robotic manipulator and output a force measurement (or simply an indication that a force was detected) to a processor. The manual contact may be due to a user pushing on the robotic manipulator to move the robotic manipulator in a teaching manner to perform a given task.

As shown by block 454, the method 450 includes associating the manual contact to a step movement of the robotic manipulator. The step movement indicates an amount of movement. As an example, to do the association, a processor may perform a table lookup to determine the amount of movement indicated by the step movement. The robotic device may be configurable to a teach mode, and in the teach mode, a fine-tuning step movement setting may be customizable to any amount of movement or distance. Then, in the teach mode, based on detection of a manual contact, the robotic manipulator may move the corresponding step movement, or distance associated with the step movement. There may be a number of settings for various resolutions associated with various teach modes to enable fine-tuning as desired.

As shown by block 456, the method 450 includes determining, by one or more processors, a number of step movements to apply. Thus, in addition to determining the step movement, or amount of movement to move, a number of the step movements to be performed can also be determined. The number of step movements to perform can be determined in a number of ways.

As one example, an amount of force of the manual contact, based on one or more outputs of one or more force sensors on the robotic manipulator, can be determined. Subsequently, the number of step movements will be related to the amount of force of the manual contact. Thus, for higher applied forces, a larger number of step movements may be performed. Specific examples may include when a force is less than 50 N, a number of step movements may be in a range of 1-3 steps, and when a force is greater than 100 N, a number of step movements may be in a range of 5-10 steps.

A number of steps may also be related to a distance per step. Thus, when a distance per step is set to be higher, a number of steps mapped to a manual contact may be set to be lower, for example. As another example, the amount of movement per step movement may also be related to the amount of force of the manual contact. Specific examples may include when a force is less than 50 N, an amount of a step movement may be in a range of about 10 micrometers, and when a force is greater than 100 N, an amount of a step movement may be in a range of about 10 mm.

As another example, a duration of application of the manual contact may be determined, and the number of step movements or the amount of movement per step movement may be based on the duration of application of the manual contact. In this example, a longer application of force may map to a larger number of steps, or a larger amount of distance per step, for instance.

Thus, mapping of the manual touches or contacts to movement of the robotic manipulator arm can be based on amount of force or duration of force that maps to an amount or number of steps. In this way, a user may teach micro-movements manually to the robotic device.

In addition, movement may be mapped to a distance that is a lateral or linear distance, or a rotational distance (in terms of an amount of degrees of rotation), or a combination of both. Mappings may be customizable by users and set to any desired setting as may be desired for a given task or given configuration of a robotic device, or due to available degrees of freedom of the robotic device.

As shown by block 458, the method 450 includes causing, by the one or more processors, the robotic manipulator to move the number of step movements in increments and then stop. As an example, a force may be detected and associated with three step movements, each of 10 microns in distance. After detection of the force, the robotic manipulator may be configured to move the three step movements in increments so as to move one step movement at a time, and then stop moving after completion of movement of the three step movements.

In another example, the robotic manipulator can be configured to move the number of step movements based on a repeat rate so as to move in increments over time based on an application of one manual contact. Thus, rather than having a user touch the robotic manipulator ten times to make ten movements, the step rate can be set to be a repeat rate (at a given rate), so that due to one manual contact, the robotic manipulator may then be configured to move one step movement ten times.

The robotic manipulator may be configured to move along a plurality of directions or a plurality of degrees of freedom (DOF), and a direction at which the step movements occur can be set to be along any of the DOF. In one example, a directional axis of application of the manual contact to the robotic manipulator can be determined, and the robotic manipulator can then be caused to move the number of step movements in increments along the directional axis. In this example, the robotic manipulator may move in a direction of the received manual contact. The robotic device can be determined to detect a direction closest to the applied contact (through outputs of an inertial measurement unit (IMU), accelerometer, gyroscope, force sensor, etc.), and move along an axis generally related to the direction. Degrees of freedom of the robotic manipulator can be mapped to axes or directions of possible movement, and a coordinate system can be set for configurations of an arm. A reference frame for defining directions along certain axes can also be mapped to the possible directions of movement.

Within further examples, a feedback can be provided by the robotic manipulator indicative of completion of the movement of the robotic manipulator over the number of step movements in increments. The feedback may include blinking lights, an audio signal, or a vibrational signal for each movement or for completion of all step movements.

Thus, within examples, the methods 400 and 450 may be useful to assist teaching the robotic device to perform certain tasks. When in a teach mode, the robotic manipulator is moveable along one or more degrees of freedom, and based on movement, the robotic manipulator is configured to save one or more positions of the robotic manipulator during the movement. The methods may be useful for providing a fine-tuning teach mode, in which the robotic manipulator is in an initial fixed position and is configured to move in the step movement based on application of the manual contact. The methods do not require any specific amount or type of manual contact, since any force may be mapped to a certain amount of distance per step or a certain number of steps to move. Thus, a small contact can be applied to train the device, and micro-movements can be achieved through the mapping which may not be possible through manual training.

Figures 5A, 5B, 5C:
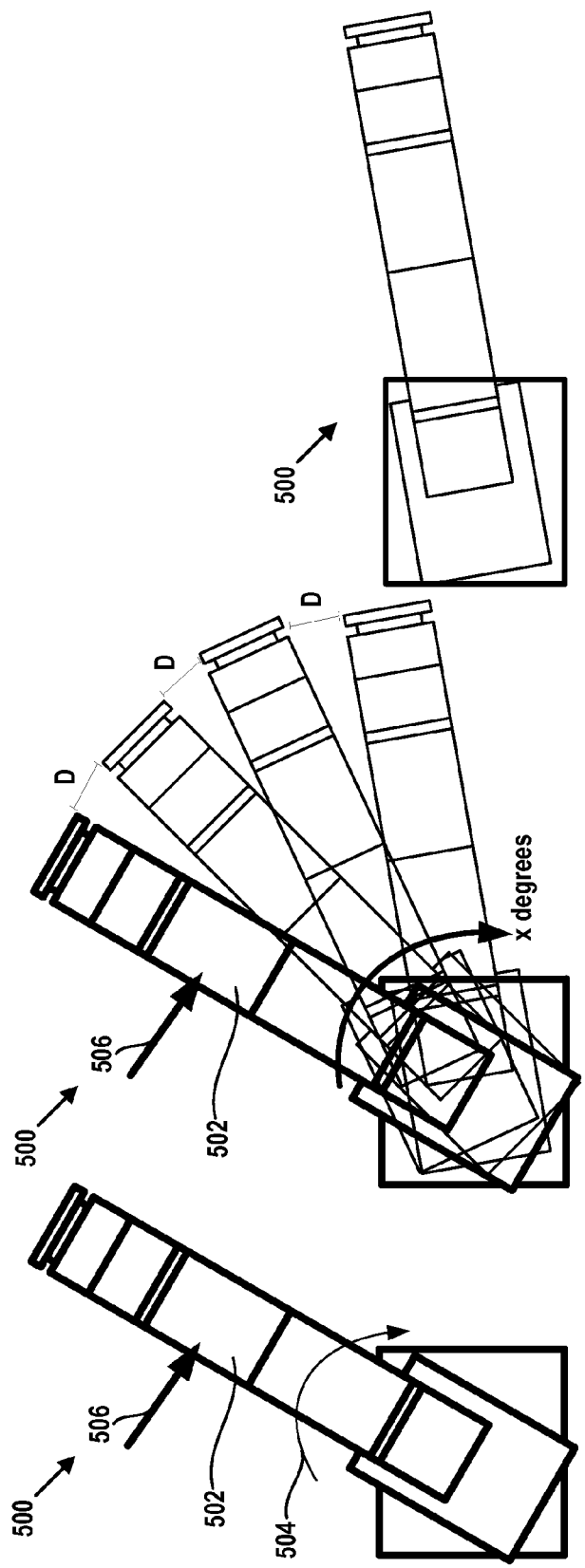
FIGS. 5A, 5B, and 5C illustrate an example operation of the method described in FIG. 4.

FIGS. 5A-5C illustrate an example operation of the methods 400 and/or 450. In FIGS. 5A-5C, a robotic manipulator 500 is shown to include a link 502 rotatable in a direction 504 on a base. In FIG. 5A, a force 506 is applied to the link 502, which may be due to a manual contact or touch of a user, another robotic device, or any other way for application of manual contact for teaching the robotic manipulator 500 to perform a task. The force 506 may, in this example, be mapped to a rotational movement of x degrees, or to a linear distance of D amount. If mapped to x degrees, after application of the force, the robotic manipulator may continuously move the x degrees and then stop in a final configuration as shown in FIG. 5C.

In an example in which the force maps to step movements of D distance, the robotic manipulator 500 may be configured to move in increments of D distance, as shown in FIG. 5B, and then stop in the final configuration as shown in FIG. 5C.

In the example shown in FIG. 5, the distance or degrees may be fine tuning movements, such that a user taps the link 502, and then the link 502 moves the preset distance without a user having to carefully place the link 502 into such position.

Thus, within one example, a user may apply a force in a certain direction, and the link 502 will step forward in the user-applied direction.

FIGS. 6A and 6B illustrate additional example operation of methods described herein. FIG. 6A illustrates a robotic manipulator 600 including a robotic link 602 mounted on a base 604. The robotic link 602 may be configured to move along any predefined (e.g., user-defined) Cartesian axes 606 so as to step along movements in a given direction. In some instances, an application of a force may not exactly be aligned with the predefined axes 606. For example, as shown in FIG. 6A, an application of a force may be along an axis as shown by arrow 608 which does not align with the predefined axes 606. In such an instance, the robotic manipulator 600 may be configured to move in a direction that is a closest step axis to a direction of the applied force rather than in a direction of the applied force. In this example, as shown in FIG. 6B, the robotic link 602 may move horizontal so as to slide along the base 604 in a direction along the predefined axis 606.

The predefined axes 606 enable known axes to step along, and if a user applies force in some direction that is not exactly one of these axes, the robotic manipulator is configured to step along a nearest of these axes (rather than stepping in the exact direction the user input is applied). Such example operation enables precisely controlled stepping and positioning precision with less sensitivity to user variation.

As further additional example variations, an axes to step along may be a set of three orthogonal (e.g., X, Y, and Z Cartesian axes), or the axes may be packed more densely. For example, a set of twelve directions and corresponding axes may be defined in a plane spaced at thirty degree intervals to define directions in which the robotic manipulator may move based on application of a force. The robotic manipulator may then step in whichever of these directions is closest to the direction of the force applied to give known discrete set of step directions. A direction of an applied force may be determined and output by a force sensor, or determined based on outputs of other sensors of the robotic device.

Figure 7:
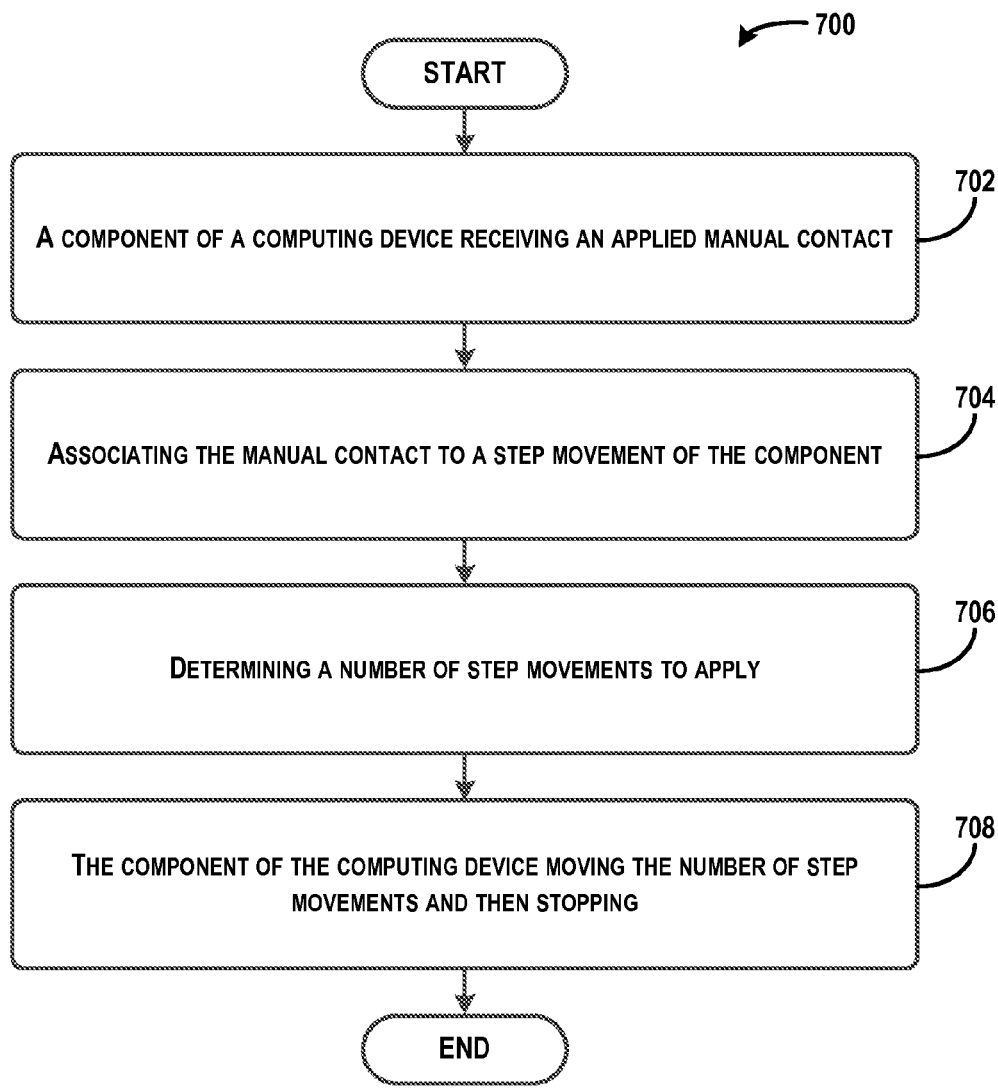
FIG. 7 is a block diagram of another example method for teaching positions to components of devices, in accordance with at least some embodiments described herein.

FIG. 7 is a block diagram of another example method for teaching positions to components of devices, in accordance with at least some embodiments described herein. Method 700 may include one or more operations, functions, or actions as illustrated by one or more of blocks 702-708. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 702, the method 700 includes a component of a computing device receiving an applied manual contact. In this example, the computing device may be any device, such as a tablet, mobile phone, computer, laptop, etc. which may receive an accessory or may have a movable device attached thereto, and a user may apply a manual contact to the component.

At block 704, the method 700 includes associating the manual contact to a step movement of the component, and the step movement indicates an amount of movement. At block 706, the method 700 includes determining a number of step movements to apply. As described above, an amount of force of the manual contact may be mapped to the number of step movements, or a duration of application of the manual contact may additionally or alternatively be mapped to the number of step movements.

At block 708, the method 700 includes the component of the computing device moving the number of step movements and then stopping. In some examples, the movement may be performed in increments and then the movement stops.

The method 700 is similar to the method 450, and includes applications to any type of computing device (in addition to robotic manipulators of a robotic device). In some examples, the method 700 optionally includes receiving, at a computing device, instructions to place a component of the computing device into a fine-tuning teach mode, in which in the fine-tuning teach mode, the component is in an initial fixed position and is configured to move in one or more step movements having a preset amount of distance based on application of a manual contact.

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the scope being indicated by the following claims.

What is claimed is:

1. A method comprising:
   providing, by one or more processors, instructions to a robotic device to place the robotic device into a fine-tuning teach mode, wherein in the fine-tuning teach mode, a component of the robotic device is in a given position and is configured to move based on application of a manual contact in one or more step movements having a preset amount of distance;
   receiving, by the one or more processors one or more signals output from a force sensor coupled to the component of the robotic device, the one or more signals indicating that a given manual contact is applied to the component of the robotic device;
   determining that the given manual contact is applied to the component of the robotic device based on the one or more signals output from the force sensor; and
   associating the manual contact to the one or more step movements of the component of the robotic device;
   while in the fine-tuning teach mode, causing, by the one or more processors, the component of the robotic device to incrementally move in the one or more step movements having the preset amount of distance in response to the one or more signals output from the force sensor that are used to determine the one or more step movements to apply to the component of the robotic device.

2. The method of claim 1, further comprising:
providing instructions to the robotic device to place the robotic device into a coarse teach mode, wherein in the coarse teach mode, the component of the robotic device is moveable along one or more degrees of freedom, and based on movement, the robotic device is configured to save one or more positions of the component of the robotic device during the movement.

3. The method of claim 1, wherein the one or more step movements are each associated with a respective preset amount of distance.

4. The method of claim 1, further comprising:
determining, by the one or more processors, a number of step movements to apply based on the given manual contact.

5. The method of claim 4, further comprising:
performing a table lookup to determine the preset amount of distance indicated by a given step movement.

6. The method of claim 4, further comprising:
determining an amount of force of the given manual contact based on one or more outputs of one or more force sensors on the robotic manipulator; and
based on the amount of force of the given manual contact, determining, by the one or more processors, the number of step movements.

7. The method of claim 4, further comprising:
determining a duration of application of the given manual contact; and
based on the duration of application of the given manual contact, determining, by the one or more processors, the number of step movements.

8. The method of claim 1, further comprising:
causing, by the one or more processors, the component of the robotic device to move the one or more step movements based on a repeat rate so as to move in increments over time based on an application of one manual contact.

9. The method of claim 1, further comprising:
the component of the robotic device incrementally moving in the one or more step movements having the preset amount of distance and then stopping.

10. The method of claim 1, wherein the component of the robotic device is configured to move along a plurality of directions, and the method further comprises:
determining a directional axis of application of the given manual contact to the component of the robotic device; and
causing, by the one or more processors, the component of the robotic device to move the one or more step movements in increments along the directional axis.

11. The method of claim 1, wherein the component of the robotic device is configured to move along a plurality of directions, and the method further comprises:
determining one or more directional axes defining one or more directions along which the component of the robotic device is configured for movement;
determining a directional axis of application of the given manual contact to the component of the robotic device; and
causing, by the one or more processors, the component of the robotic device to move the one or more step movements in increments along a given directional axis of the one or more directional axes that is closest to the directional axis of application of the given manual contact to the component of the robotic device.

12. The method of claim 1, further comprising:
providing a feedback by the robotic device indicative of completion of the movement of the component of the robotic device over the one or more step movements in increments.

13. A method comprising:
receiving, at a computing device, instructions to place a component of the computing device into a fine-tuning teach mode, wherein in the fine-tuning teach mode, the component is in a given position and is configured to move based on application of a manual contact in one or more step movements having a preset amount of distance;
the component of the computing device receiving an applied manual contact;
receiving, one or more signals output from a force sensor coupled to the component of the computing device, the one or more signals indicating that the applied manual contact is applied to the component of the computing device;
determining that the manual contact has been applied to the component of the computing device based on the one or more signals output from the force sensor; and
associating the manual contact to the one or more step movements of the component of the computing device;
while in the fine-tuning teach mode, the component of the computing device being instructed by the computing device to responsively move in the one or more step movements having the preset amount of distance in response to the one or more signals output from the force sensor that are used to determine the one or more step movements to apply to the component of the robotic device.

14. The method of claim 13, further comprising:
the component of the computing device moving a number of step movements in increments and then stopping.

15. The method of claim 14, further comprising:
determining an amount of force of the applied manual contact based on one or more outputs of force sensors; and
based on the amount of force of the applied manual contact, determining the number of step movements.

16. The method of claim 13, wherein the component is configured to move along a plurality of directions, and the method further comprises:
determining a directional axis of application of the applied manual contact to the component; and
the component moving the one or more step movements in increments along the directional axis.

17. A system comprising:
one or more components coupled to a computing device;
a force sensor coupled to the one or more components;
one or more processors;
data storage including instructions executable by the one or more processors to cause the one or more components or the computing device to perform functions comprising:
receiving instructions to place the one or more components coupled to the computing device into a fine-tuning teach mode, wherein in the fine-tuning teach mode, the one or more components are in a given position and are configured to move based on application of a manual contact in one or more step movements having a preset amount of distance;

receiving one or more signals output from the force sensor coupled to the one or more components, the one or more signals indicating that a given manual contact is applied to the one or more components;

determining that the given manual contact is applied to the one or more components based on the one or more signals output from the force sensor; and associating the given manual contact to the one or more step movements of the one or more components;

while in the fine-tuning teach mode, causing the one or more components to move in the one or more step movements having the preset amount of distance in response to the one or more signals output from the force sensor that are used to determine the one or more step movements to apply to the one or more components.

18. The system of claim 17, wherein the functions further comprise:

determining an amount of force of the given manual contact; and based on the amount of force of the given manual contact, determining a number of step movements to apply.

19. The system of claim 17, wherein the functions further comprise:

determining a duration of application of the given manual contact; and based on the duration of application of the given manual contact, determining a number of step movements to apply.

20. The system of claim 17, wherein the functions further comprise:

placing the computing device into a coarse teach mode, wherein in the coarse teach mode, the one or more components are moveable along one or more degrees of freedom, and based on movement, the one or more components are configured to save one or more positions of the one or more components during the movement.

* * * * *